United States Patent [19]
Quantz

[11] 3,922,592
[45] Nov. 25, 1975

[54] FOUR-PHASE ALTERNATOR BATTERY CHARGER

[75] Inventor: Chester C. Quantz, Bay City, Mich.

[73] Assignee: Eltra Corporation, Toledo, Ohio

[22] Filed: Mar. 18, 1974

[21] Appl. No.: 451,808

[52] U.S. Cl. .................... 320/15; 320/59; 320/61; 322/28; 322/90
[51] Int. Cl.² ...................... H02J 7/24; H02R 9/00
[58] Field of Search ..................... 322/90–94, 322/28; 320/15, 61, 64, 57–59, 2–6; 307/16

[56] References Cited
UNITED STATES PATENTS

| | | | |
|---|---|---|---|
| 3,206,610 | 9/1965 | Lovrenich | 320/15 UX |
| 3,710,226 | 1/1973 | Seike | 320/15 |
| 3,771,045 | 11/1973 | Stortz | 320/59 X |
| 3,809,995 | 5/1974 | Hardin | 307/16 X |

Primary Examiner—J. D. Miller
Assistant Examiner—Robert J. Hickey
Attorney, Agent, or Firm—Oliver E. Todd, Jr.

[57] ABSTRACT

Improved apparatus for charging either a single battery or two series connected batteries having different load requirements. The apparatus includes a four-phase alternator having four stator windings each with an end connected to one terminal of a main battery to form a star connected circuit. The opposite end of each stator winding is connected through a half-wave diode rectifier to a second terminal of the main battery. Excitation of a rotor field winding on the alternator is controlled in response to the terminal voltage at the main battery to maintain such voltage constant. The apparatus may be adapted to charge an auxiliary battery connected in series with the main battery from the reversed polarity or alternate half cycle output from one or more of the stator windings. Current to the auxiliary battery is controlled to limit the maximum voltage to which the auxiliary battery is charged.

5 Claims, 3 Drawing Figures

FOUR-PHASE ALTERNATOR BATTERY CHARGER

BACKGROUND OF THE INVENTION

This invention relates to battery charging apparatus and more particularly to a four-phase alternator adapted to charge either a single battery or two series connected batteries.

Alternators are commonly used for charging vehicle batteries due to their relatively small size, efficiency, high output current capabilities and low maintenance requirements. Alternators are commonly provided with three stator windings for generating a three-phase output. Six diode rectifiers are connected for full-wave rectification of the three-phase alternator output to obtain a battery charging current having a relatively small ripple. Three of the diode rectifiers are connected in the same polarity from the three stator windings to supply current to one battery terminal and the three remaining diode rectifiers are connected in the opposite polarity from the three stator windings to the other battery terminal. The six diode rectifiers become heated during operation of the alternator due to internal $I^2R$ losses and must be cooled to prevent failure. As a consequence of having two polarities for the diode rectifiers, two heat sinks are required to cool the diode rectifiers and one of the heat sinks must be electrically insulated from ground. The use of six diode rectifiers and the need for two separate heat sinks adds appreciably to the cost of the battery charging apparatus.

Some vehicles, particularly large diesel driven trucks, require a relatively high voltage for cold weather starting. The high voltage is generally achieved by means of an auxiliary or "B" battery connected in series with a main or "A" battery during starting. Only the main battery is used for supplying normal electrical requirements of the vehicle, such as power for operating lights, radio equipment, controls, etc. In the past, a single alternator could not be used for directly charging the two batteries while they are connected in series since the batteries have different load requirements. One common arrangement for charging the auxiliary battery is to provide a solenoid actuated switch for normally connecting the main and auxiliary batteries electrically in parallel for simultaneous charging from an alternator. During starting, the switch connects the main and auxiliary batteries electrically in series with a starter motor. One problem with a system of this type is in the reliability of the switch which may be required to carry current peaks as high as 2000 amperes or more through its contacts. Another improved charging arrangement for series connected batteries is shown in U.S. Pat. No. 3,206,610 which issued on Sept. 14, 1965 to Lovrenich. This patent shows a system in which the main battery is charged directly from an alternator. A converter is connected to the main battery and alternator for charging the auxiliary battery. However, systems of this type may be relatively expensive. Furthermore, the circuitry required for the converter may be subject to failure under adverse conditions in which a vehicle may be operated.

SUMMARY OF THE INVENTION

According to the present invention, an improved four-phase alternator is provided for charging either a single battery or for simultaneously charging two batteries connected in series and having different load requirements. The improved battery charging apparatus generally comprises a regulated four-phase alternator. The alternator has four stator windings which are star connected, each having one end connected in common to a first output terminal. The other ends of the stator windings are connected through diode rectifiers to a second output terminal. The output terminals are connected to a battery to be charged. A conventional regulator senses the battery voltage across the output terminals for controlling excitation to a rotor field winding to maintain a predetermined output voltage. Only four diode rectifiers are required for rectifying the alternator output instead of the conventional six and each of the diodes is connected in a common polarity to the battery, permitting the use of a single grounded heat sink, thus reducing the cost of manufacturing the alternator system.

In a modified embodiment of the invention, the above-described four-phase alternator is adapted for charging two series connected batteries. The regulated output from the alternator is connected to directly charge a main or "A" battery. An auxiliary or "B" battery is connected in series with the main battery at the end of the main battery connected through the first output terminal to the common connection to the four stator windings. The outputs from one or more of the stator windings are connected through diode rectifiers for charging the auxiliary battery. The diode rectifiers are at a polarity reversed from the polarity of the four diode rectifiers connected to charge the main battery. Thus, the stator windings connected to the auxiliary battery supply power during alternate half cycles for charging the main battery and the auxiliary battery. A Zener diode and a silicon controlled rectifier (SCR) are provided for controlling current delivered to the auxiliary battery to limit charging of the auxiliary battery to a predetermined maximum voltage. Thus, the four-phase alternator is readily adapted for charging the series connected main and auxiliary batteries at a minimum expense without the need of either a series-parallel switch capable of handling extremely high currents or of a converter for charging the auxiliary battery from the main battery.

Accordingly, it is a preferred object of the invention to provide improved apparatus for battery charging.

Another object of the invention is to provide a battery charging alternator assembly which is less expensive than prior art alternators.

Still another object of the invention is to provide improved apparatus for directly charging two series connected batteries serving different load requirements from a single alternator.

Other objects and advantages of the invention will become apparent from the following detailed description, with reference being made to the accompanying drawings.

DESCRIPTION OF THE PREFERRED EMBODIMENTS

Figure 1:
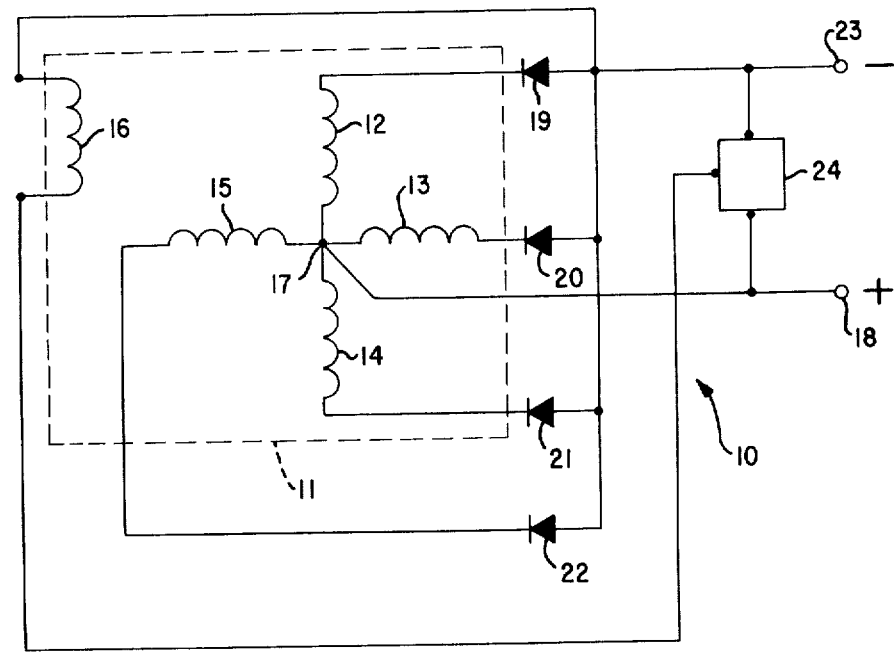
FIG. 1 is a schematic circuit diagram of apparatus according to the present invention for charging a single battery.

Turning now to the drawings and particularly to FIG. 1, the circuit of an improved battery charger 10 is shown. The battery charger 10 generally comprises an alternator 11 having four stator windings 12-15 wound in a four-phase arrangement and a rotor mounted field winding 16 for exciting the stator windings 12-15. One end of each stator winding 12-15 is connected to a common terminal 17 such that the stator windings 12-15 are in a star connected circuit. The common terminal 17 is connected to a positive output terminal 18 which is adapted for connecting to the positive terminal of a battery to be charged. The other ends of the stator windings 12-15 are connected, respectively, through diode rectifiers 19-22 to a negative output terminal 23. The output terminal 23 is adapted to be connected to the negative terminal of a battery to be charged.

The output voltage of the alternator is regulated in a conventional manner. A conventional voltage regulator 24 is connected between the output terminals 18 and 23 for sensing the output terminal voltage which will be the same as the terminal voltage of the battery being charged. The field winding 16 is connected between the negative output terminal 23 and the regulator 24. The regulator 24 excites the field winding 16 to a level necessary to maintain a constant output voltage at the terminals 18 and 23. If the battery charger 10 is to be used to charge a 12-volt battery, for example, the regulator 24 may be adapted to maintain an output voltage at a constant value on the order of fourteen volts. When a discharged or partially discharged battery is connected across the output terminals 18 and 23, a high charging current is required to maintain the desired output voltage. Therefore, the regulator 24 supplies maximum excitation to the field winding 16. As the battery becomes charged, its terminal voltage increases. This in turn reduces the demand for current to maintain the desired voltage across the output terminals 18 and 23 and the regulator 24 decreases excitation to the field winding 16. When the battery is fully charged, its terminal voltage will reach fourteen volts and minimum excitation is applied to the field winding 16.

Since the stator windings 12-15 are star connected from the common terminal 17, the circuit may be described either as a four-phase half-wave rectified configuration or as a two-phase full-wave center tapped configuration. As in a three-phase full-wave rectified alternator, the stator is wound with one coil per pole per phase. However, each coil is wound around a minimum of two teeth per stator pole instead of a minimum of three teeth per stator pole for the three-phase alternator. Each phase is wound and connected so that an equal number of turns for each of the windings 12-15 encompasses all of the stator pole groups. This allows the stator pole magnetic circuit to be reset as each half cycle of the phase output current flows in the opposite direction towards the phase center tap or common terminal 17. As a consequence, the noise level of the four-phase half-wave rectified alternator output is approximately equal to that of the output of a conventional three-phase full-wave rectified alternator circuit.

Figure 2:
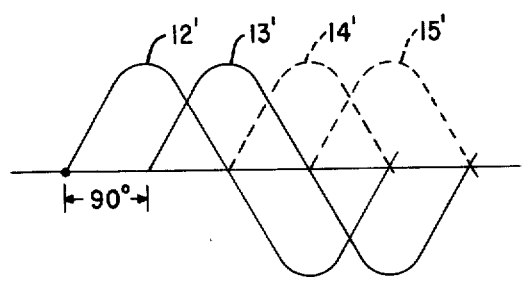
FIG. 2 is a graph showing typical alternator output voltages occurring in the circuit of FIG. 1.

The voltages applied to the output terminals 18 and 23 from the different stator windings 12-15 are shown in FIG. 2. The stator winding 12 generates a sinusoidal output shown at 12'. The stator winding 13 generates an output 13' displaced 90° from the output 12'. Similarly, the stator winding 14 generates an output 14' displaced 90° from the output 13' or 180° from the output 12' and the stator winding 15 generates an output 15' displaced 90° from the output 14' and 270° from the output 12'. The diode rectifiers 19-22 provide half-wave rectification for the outputs 12'-15' of the stator windings 12-15, respectively. It will be noted from FIG. 2 that the positive portion of the output 14' is the mirror reflection of the negative portion of the output 12' and that the positive portion of the output 15' is the mirror reflection of the negative portion of the output 13'. Thus, the operation of the four-phase alternator 11 may be referred to either as a four-phase half-wave rectified output or a two-phase full-wave rectified output. As a practical matter, the two stator windings 12 and 14 may be wound as a single center tapped winding and the stator windings 13 and 15 may also be wound as a single center tapped winding with the center taps of the two windings connected together to the terminal 17.

Figure 3:
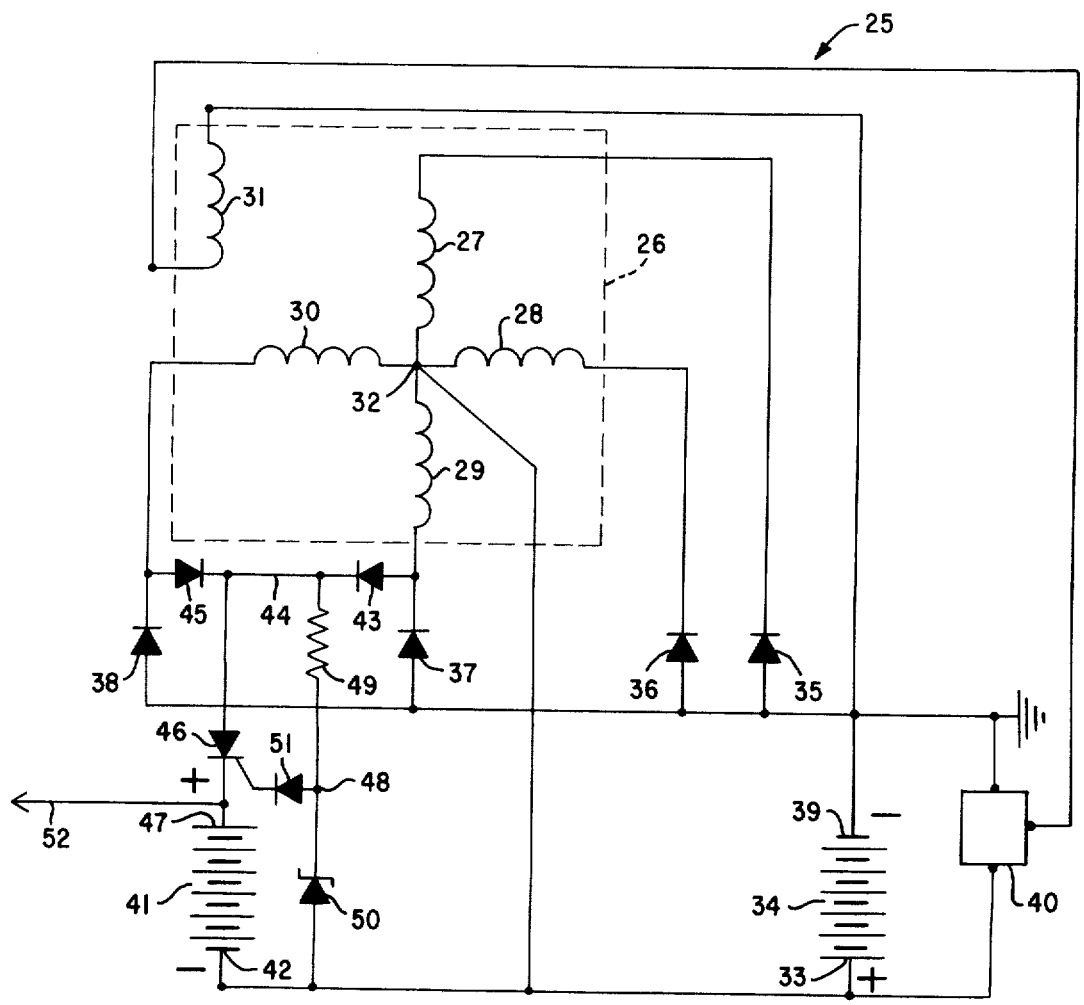
FIG. 3 is a modified embodiment of battery charging apparatus adapted to directly charge two series connected batteries from a single four-phase alternator.

Turning now to FIG. 3, a modified battery charger 25 is shown. Again, the battery charger 25 includes a four-phase alternator 26 having four stator windings 27-30 and a rotor mounted field winding 31. The four stator windings 27-30 are connected together to a common terminal 32 which is in turn connected to a positive terminal 33 on a main or "A" battery 34. Four diode rectifiers 35-38 effectively connect the four stator windings 27-30, respectively, in parallel to a negative or grounded terminal 39 on the battery 34. A conventional voltage regulator 40 is connected between the positive terminal 33 and the negative terminal 39 of the battery 34 for sensing the voltage between the terminals 33 and 39. The voltage regulator 40 controls excitation to the field winding 31 for regulating the maximum voltage across the main battery 34, and hence regulating the charging rate for the main battery 34. The operation of the above-described portion of the battery charger 25 is identical to the operation of the charger 10 shown in FIG. 1.

In addition to the main battery 34, the battery charger 25 also charges an auxiliary or "B" battery 41 connected in series with the main battery 34. The common terminal 32 from the four stator windings 27-30 is connected to a negative terminal 42 to the auxiliary battery 41 in addition to being connected to the positive terminal 33 of the main battery 34. The stator winding 29 is connected through a diode rectifier 43 to a junction 44 and the stator winding 30 is connected through a diode rectifier 45 to the junction 44. The junction 44 is in turn connected through an SCR 46 to a positive terminal 47 on the auxiliary battery 41. A junction 48 is connected through a resistor 49 to the junction 44, through a Zener diode 50 to the negative terminal 42 on the auxiliary battery 41 and through a diode 51 to the gate electrode of the SCR 46. In operation of the charging system for the auxiliary battery 41, the gate of the SCR 46 is normally clamped at a reference voltage established by the Zener diode 50. As the voltage across the auxiliary battery 41 increases, the gate-to-cathode current to the SCR 46 decreases to a point where no conduction through the SCR 46 will take place until the voltage of the auxiliary battery 41 decreases and recharging is necessary. The diode rectifiers 43 and 45 provide the current for charging the auxiliary battery 41 from the stator windings 29 and 30, respectively. It will be noted that the polarity of the diode 43 is opposite to the polarity of the diode 37 which is also connected to the stator winding 29 and that the polarity of the diode 45 is opposite to the polarity of the diode 38 which is also connected to the stator winding 30. This results in the sinusoidal voltages across the stator windings 28 and 29 charging the auxiliary battery 41 during half cycles of one polarity and charging the main battery 34 during half cycles of the opposite polarity. During normal usage of the batteries 34 and 41, the negative terminal 39 of the main battery 34 is connected to an electrical ground in a vehicle while the positive terminal 33 is connected to supply energy to lights, instruments, communications equipment and various other energy consuming devices within a vehicle in which the charger 25 is used. The auxiliary battery 41, which is maintained in series with the main battery 34, has a positive output 47 connected to a terminal 52. The terminal 52 is connected through a normally open starter switch to a starter motor for cranking the vehicle engine. Thus, the auxiliary battery 41 is used only during starting of the engine. Since the auxiliary battery 41 is used for only a portion of the time during which the main battery 34 is used, the charging requirements are less. Thus, either one or two of the stator windings 27–30, such as the two stator windings 29 and 30, are adequate for charging the auxiliary battery 41 while all four stator windings 27–30 are used for charging the main battery 34.

Turning again to FIG. 1, it will be noted that the four diode rectifiers 19–22 are connected in the same polarity to the output terminal 23. As a consequence, the diode rectifiers 19–22 may be mounted on a single heat sink. It should be noted that there will be reduced I²R losses in the diode rectifiers of the charger 10 over a conventional three-phase charger since there are only four rectifiers instead of six. Two heat sinks are required for the charger 25 shown in FIG. 3. The diode rectifiers 35–38 are mounted together on a single grounded heat sink while the diode rectifiers 43 and 45 and the SCR 46 are mounted together on an insulated heat sink.

It will be appreciated that various modifications and changes may be made in the above-described battery chargers without departing from the spirit and the scope of the claimed invention.

What I claim is:

1. Battery charging apparatus comprising, in combination, a four-phase alternator having a rotor field winding and four stator windings, each stator winding having first and second ends, means connecting said first end of each stator winding to a first terminal to form a star connected circuit, four half-wave rectifiers each having cathode and anode electrodes, means connecting a like electrode of a different one of said rectifiers to the second end of each stator winding, means connecting the other electrodes of said rectifiers to a second terminal, regulating means responsive to the voltage between said first and second terminals for controlling current in said rotor field winding to maintain such terminal voltage at a predetermined level, means for connecting said first and second terminals to a first battery for charging such first battery, and means for charging a second battery from said alternator while such second battery is connected in series with a first battery connected to said first and second terminals, said second battery charging means including a fifth half-wave rectifier having anode and cathode electrodes, means connecting one electrode of said fifth rectifier to the second end of a first of said stator windings with the polarity of said fifth rectifier opposite the polarity of the rectifier connected between such first stator winding and said second terminal, and means for connecting said first terminal and the other electrode of said fifth rectifier to terminals of such second battery for charging such second battery.

2. Battery charging apparatus, as set forth in claim 1, and including means for regulating the charging of such second battery.

3. Battery charging apparatus, as set forth in claim 2, wherein said regulating means for such second battery includes electronic switch means having input and output terminals connected between said fifth rectifier and such second battery and having a gate electrode, and means connected to said gate electrode responsive to the voltage across such second battery for controlling conduction of said switch means to limit the voltage of such second battery.

4. Battery charging apparatus, as set forth in claim 3, and including a sixth half-wave rectifier having anode and cathode electrodes, means connecting said other electrode of said fifth rectifier to the like electrode of said sixth rectifier, and means connecting the remaining electrode of said sixth rectifier to said second end of a second of said stator windings, said first and second stator windings generating voltages displaced by 90°.

5. Battery charging apparatus comprising, in combination, a two-phase alternator having a rotor field winding and two stator windings, each stator winding having two ends and a center tap, means connecting said stator winding center taps to a first terminal, four half-wave rectifiers each having cathode and anode electrodes, means connecting the like electrode of a different one of said rectifiers to each end of said stator windings, means connecting the other electrodes of said rectifiers to a second terminal, regulating means responsive to the voltage between said first and second terminals for controlling current in said rotor winding to maintain such terminal voltage at a predetermined level, means for connecting said first and second terminals to a first battery for charging such first battery, fifth and sixth rectifiers each having anode and cathode electrodes, means connecting one electrode of said fifth rectifier to one end of a first of said stator windings in a polarity opposite the polarity of the other rectifier connected to such end, means connecting one electrode of said sixth rectifier to one end of the second of said stator windings in a polarity opposite the polarity of the other rectifier connected to such end, means connecting the other electrodes of said fifth and sixth rectifiers to a third terminal, means for connecting said first and third terminals to a second battery for charging such second battery, and means responsive to the voltage between said first and third terminals for controlling the charging of such second battery.

* * * * *